UNITED STATES PATENT OFFICE.

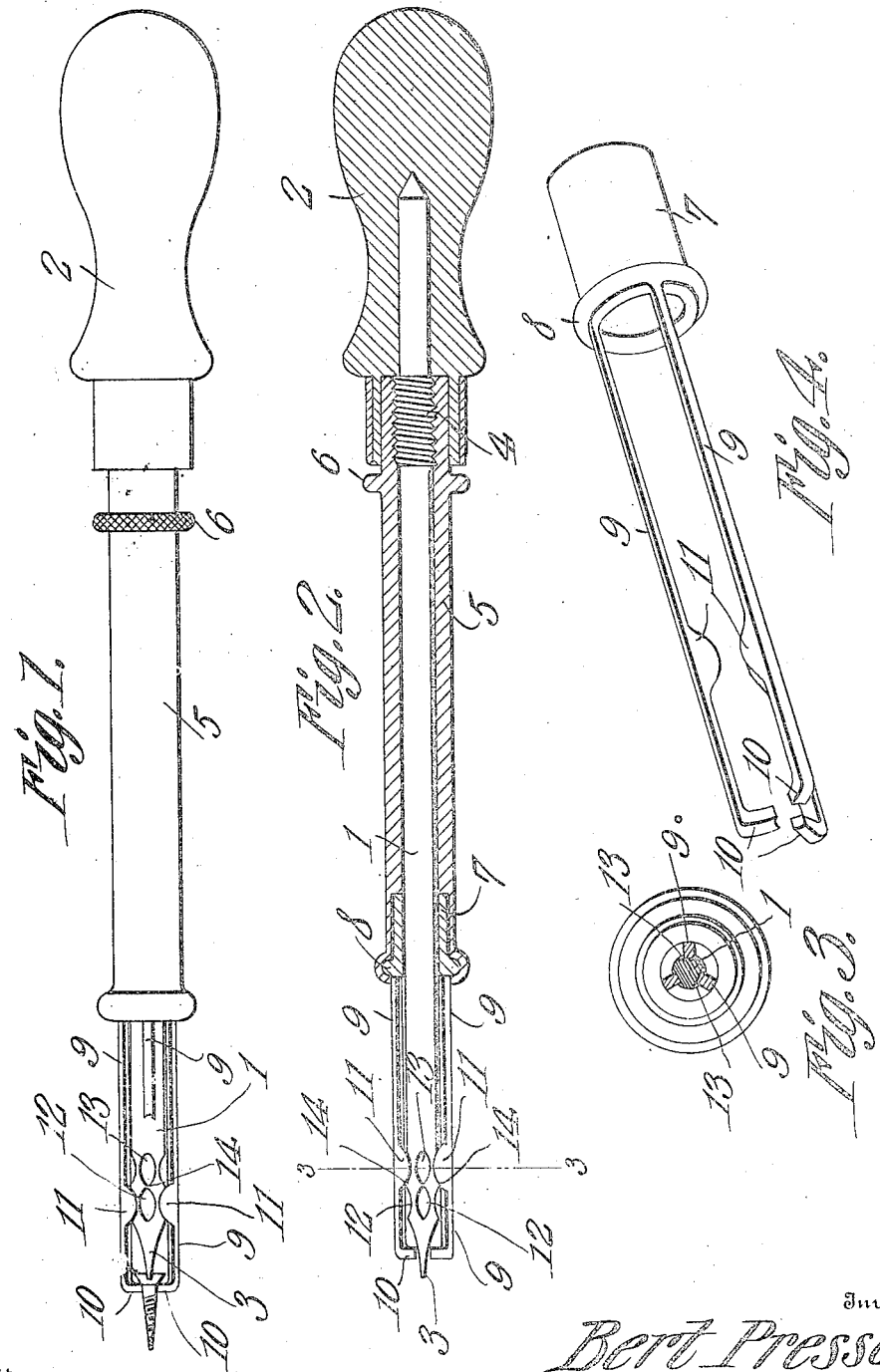

BERT PRESSON, OF PITTSBURG, KANSAS.

SCREW-DRIVER.

942,742.   Specification of Letters Patent.   Patented Dec. 7, 1909.

Application filed August 26, 1908. Serial No. 450,382.

*To all whom it may concern:*

Be it known that I, BERT PRESSON, a citizen of the United States, residing at Pittsburg, in the county of Crawford and State of Kansas, have invented a new and useful Screw-Driver, of which the following is a specification.

This invention relates to screw drivers, and has for its object to provide a tool of this type with a simple and efficient means for holding a screw in engagement with the bit of the driver so that said screw may be inserted into or removed from a part otherwise inaccessible.

To this end the invention comprises a sleeve rotatably mounted on the shank of a screw driver and connected thereto by a screw thread so that when said shank is rotated and the sleeve held in one hand, the threaded connection causes said shank to move end-wise relatively to the sleeve. Connected to the lower end of the sleeve by a swivel is a collar from which depend grasping fingers for holding a screw in engagement with the screw driver. If desired the bit of the screw driver may be projected beyond the fingers and used in the ordinary manner.

With these and other objects in view, the invention consists of the novel combination and arrangement of parts hereinafter described and claimed and illustrated in the accompanying drawing, in which:—

Figure 1 is a side elevation of the improved screw driver; Fig. 2 a longitudinal sectional view of the same; Fig. 3 a cross-section on the line 3—3 of Fig. 2, and Fig. 4 a perspective view of the screw clamp or holder.

Like reference characters are used for the same parts in all the figures.

In the drawing, 1 indicates the cylindrical shank of a screw driver having a fixed handle 2 at one end and a flat bit 3 at the opposite end as usual. Formed on the shank 1 at any convenient or desired position is a short left hand screw thread 4, here shown as being just within the handle 2. Surrounding the shank for a suitable distance thereon is a sleeve 5 threaded within to engage the screw 4 on the shank, and provided with an exterior knurled circular rib 6 for rotating the same by the fingers when it is desired to move the sleeve endwise on the shank.

Within the lower end of the sleeve 5 is a collar 7 with a rounded flange 8 on its lower end over which the end of the sleeve 5 is bent or spun to retain the collar in place and rotate thereon. Projecting downwardly from the collar 7 are fingers 9, three being here shown, substantially parallel to the shank 1, and having their lower ends bent inwardly toward the axis of said shank to form claws 10 for grasping a screw. Intermediate the length of each finger 9 on its inner side is a protuberance 11 adapted to enter depressions 12 and 13 cut out of the shank 1, leaving an elevated portion 14 between them.

To use the tool, the screw driver in the position shown in Fig. 2 with the end of the bit projecting, the bit will be placed in the nick in the head of the screw to be removed and the screw driver turned to the left as usual, the sleeve being held stationary. As the screw begins to draw out, the left hand thread 4 on the shank forces the sleeve 5 relatively toward the screw causing the protuberances on the fingers to ride out of the depressions 13 onto the elevations 14, thus spreading the claws 10 far enough apart to permit them to pass over the screw head and grasp the screw below its head as the protuberances are carried into the depressions 12. The sleeve may now be released and the screw driver continued to be turned until the screw is removed, it being retained by the bit of the screw driver and the claws 10, see Fig. 1.

When a screw is to be inserted, it may be placed in the screw driver in any convenient manner and then inserting the screw at the desired place, the screw driver is turned to the right, the hand holding the sleeve from turning. The left hand screw causes a reverse movement of the fingers and again spread the claws thereon to release the head of the screw while it is being driven home.

What is claimed is:—

1. In a device of the class described, a shank threaded adjacent one of its ends and being provided with protuberances and depressions adjacent its other end; a collar rotatably mounted upon the shank and being provided with resilient fingers having protuberances to engage the depressions and protuberances upon the shank; and a sleeve swiveled to the collar and being threaded to engage the shank.

2. In a device of the class described, a shank threaded adjacent one of its ends and being provided with protuberances and depressions adjacent its other end; a collar rotatably mounted upon the shank and having a rounded head, the said collar being provided with resilient fingers having protuberances to engage the depressions and protuberances upon the shank; and a sleeve rotatably mounted upon the shank and being threaded to engage the shank, the said sleeve being arranged to inclose the collar and being inbent terminally to engage the rounded head thereof.

In testimony that I claim the foregoing as my own, I have hereto affixed my signature in the presence of two witnesses.

BERT PRESSON.

Witnesses:
LIZZIE ROITZ,
EDGAR LEWIS.